Figures 1, 2, 3, 4, 5:
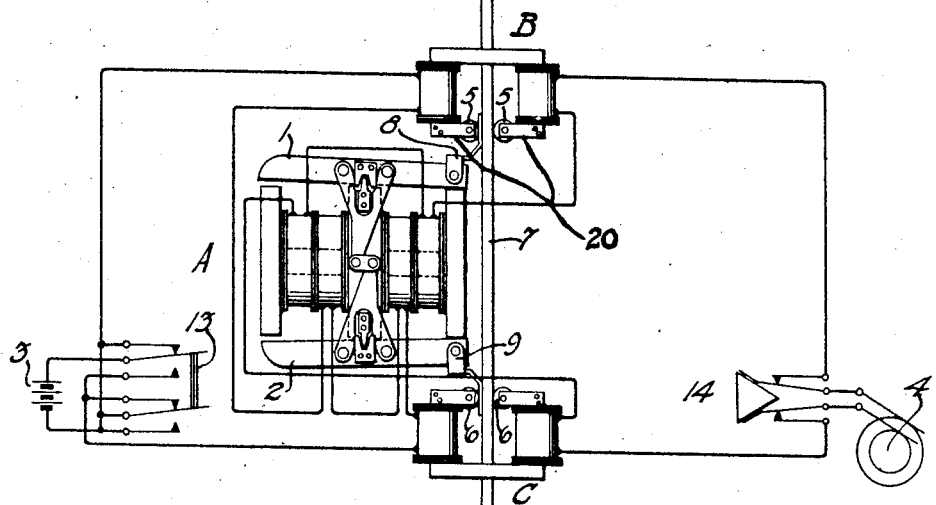

Jan. 20, 1925.

G. F. ATWOOD 1,523,385

SWITCHING DEVICE

Filed June 27, 1922

Inventor:
George F. Atwood
by W. E. Beath, Atty.

Patented Jan. 20, 1925.

1,523,385

UNITED STATES PATENT OFFICE.

GEORGE F. ATWOOD, OF NEWARK, NEW JERSEY, ASSIGNOR TO WESTERN ELECTRIC COMPANY, INCORPORATED, OF NEW YORK, N. Y., A CORPORATION OF NEW YORK.

SWITCHING DEVICE.

Application filed June 27, 1922. Serial No. 571,237.

*To all whom it may concern:*

Be it known that I, GEORGE F. ATWOOD, a citizen of the United States, residing at Newark, in the county of Essex, State of New Jersey, have invented certain new and useful Improvements in Switching Devices, of which the following is a full, clear, concise, and exact description.

This invention relates to motor devices and more particularly to a driving arrangement which is particularly adaptable for use with panel type switches, wherein a brush or wiper is adapted to be moved linearly to selectively engage switch terminals arranged in panel formation.

In some mechanisms of the type mentioned above, it is the usual practice to drive the rack or selector rod with an intermittent motion by pulses of current sent out by a calling subscriber. This intermittent motion of the selector rod necessitates a relatively large supply of energy, in that, after each impulse, the mass (including rack, brush arms, brushes, etc.) is brought to rest and is re-accelerated with the following pulse.

In other mechanisms of the type mentioned above where a continuous motion of a plurality of selector rods is obtained from a common power source, it follows that if the common source of power fails, this renders inoperative all of the selector rods controlled by it.

An object of the present invention is to avoid the disadvantage inherent in the first mentioned type of mechanisms by providing for a continuous motion of the selector rod and to avoid the disadvantage in the second mentioned type of mechanisms by providing drives individual to each of the selector rods.

This object is accomplished by providing an electric motor individual to each of the selector rods for causing continuous movement thereof.

A complete understanding of the invention will be obtained from the following detailed description and by reference to the accompanying drawing.

Fig. 1 shows the complete assembly of the driving and gripping magnets and their relative arrangements with respect to the selector rod of a panel type switch. The circuit arrangement for these magnets is also disclosed in this figure. Fig. 2 is a section through one of the gripping magnets. Figs. 3, 4 and 5 show a modified form of the invention in various stages of operation.

A power or driving magnet A is shown provided with a double magnetic circuit, and armatures 1 and 2 interlocked and with their operating ends adapted to move in opposite directions. The magnetic circuits are energized alternately by two sets of electrical circuits, one of which is a direct current winding supplied from the source 3 and used for polarizing the magnet, the other which may be termed the operating circuit is an alternating current winding supplied from any suitable source 4, preferably a 60-cycle source.

Gripping or clutch magnets B and C are provided with two sets of windings, one set for direct current and the other an alternating current winding in series with the alternating current winding of the operating coil of magnet A.

The polarities of the direct current windings of the magnets B and C are made to aid the alternating current build up the magnetic field during one-half cycle in one of these magnets and oppose the alternating current in the other magnet during the same interval of time. These two magnets have their alternating current coils connected in series with each other and in series with the alternating current windings of the driving magnet A, so that each magnet will be alternately energized, and in phase with the impressed alternating current supply.

In the magnetic circuits of the magnets B and C, there are two sets of rollers 5 and 6 mounted on the pole pieces in such a manner as to operate in a practically balanced field so that their free rotation is not interfered with. The rollers 5 and 6 are so positioned on the pole pieces of magnets B and C as to permit a slight longitudinal movement such that when the direct and alternating currents through either magnet B or C are cooperating to energize either magnet B or C, rollers 5 or rollers 6 are attracted toward each other in the magnetic circuit set up between the pole pieces of the energized magnet with sufficient force to cause the rollers to press against and embrace the movable selector rod 7 and the frictional clutching strip 8 or 9 associated with the energized magnet, the frictional clutching strips 8 and 9 being pivotally mounted on the armatures 1 and 2 respectively.

The selector rod 7 is provided with a brush arm 10 which carries a brush or wiper 11. Upon the upward movement of the selector rod 7, subsequent to the conjoint operation of magnets A and C, the brush or wiper 11 wipes over the terminals 12 which are mounted in panel formation.

The operation of the switch is as follows:

Assuming the selector rod 7 to be moved upward and the armatures 1 and 2 to be disengaged from the poles at the right of magnet A, and that it is the positive pulses of the alternating current that cumulatively energize the magnet A causing it to attract armatures 1 and 2 to the poles at the right of magnet A and that it is the negative pulses that cause the magnet to repel the armatures 1 and 2 at the right of the magnet and to attract them to the poles at the left of the magnet, it is evident that the polarities of the windings of magnets B and C must be so regulated as to make the magnet B inoperative during the first positive pulse of the cycle of alternating current, so that the frictional clutching strip 8 will slip downward between the selector rod 7 and roller 5 when armature 1 is attracted to the pole at the right of magnet A. Assuming that the key 13 is in the proper position to effect this necessary polarity, the key 14 is closed and alternating current supplied to the series circuit comprising the windings of magnets A, B and C. During the first positive pulse of the cycle of this current, the magnetic circuit in magnet B has a negligible effect owing to the counter-balancing of the magnetic fluxes, caused by the direct current winding thereon, the direct and alternating current fluxes opposing each other during this interval of time. The fluxes set up by the direct and alternating currents in the windings of magnet C cooperate with one another and cause the rollers 6 to grip the selector rod 7 and the frictional clutching strip 9 so that any movement of the frictional clutching strip 9 will be experienced by the selector rod 7 and the brush arm 10. Simultaneously with the operation of magnet C, the driving magnet A is energized and armatures 1 and 2 attracted at their right ends owing to the cumulative effect of the direct and alternating current fluxes in the circuit including these ends, and the differential effect on the circuit including the ends of the armatures at the left. The upward travel of the right end of armature 2 causes the frictional clutching strip 9 to travel upward, the frictional clutching strip being held in frictional engagement with selector rod 7 owing to the pressure of the roller 6 thereon caused by the energization of magnet C. The selector rod 7 therefore experiences an upward movement and the brush 11 wipes over the terminals 12. During this time, the right end of armature 1 travels downward due to the parallel flux through the armature 1. The frictional clutching strip 8 is withdrawn freely between the rollers of the deenergized magnet B.

On the subsequent negative pulse of the cycle, the conditions are reversed. The coils of the clutch magnet B are energized, those of C deenergized and the armatures 1 and 2 are attracted towards the pole pieces at the left end of the power magnet A due to the change in polarity of the alternating current. Therefore, during the negative pulse of the cycle, the frictional clutching strip 9 slips freely between the roller 6 and selector rod 7 while the frictional clutching strip 8 is pressed against the selector rod 7 under the influence of the rollers 5 which act as the armatures of energized magnet B. The selector rod 7 will, therefore, continue its upward travel.

From the foregoing description, it is apparent that for every cycle of alternating current, the selector rod 7 experiences two impulses. Assuming the impressed alternating current to be a 60-cycle supply, the selector rod will receive 120 impulses a second. The rapidity of the impulses causes the selector rod 7 to travel with a substantially continuous motion, thereby obviating the intermittent motion heretofore experienced by the selector rod.

Upon reversing the direction of the direct current through the direct current windings of magnets A, B and C, the direction of motion of the rod 7 will be reversed and the brush 11 brought to its normal position.

The following description is directed to Figs. 3, 4 and 5.

As in the case disclosed in Fig. 1, there is a polarized driving magnet A, provided with a set of interlocked armatures 1 and 2 which are adapted to move in opposite directions. The clutch magnets B and C of Fig. 1 are replaced by a single polarized magnet D. The magnet D is provided with two direct current windings, one of which is in series with the direct current winding of magnet A and the other is permanently energized from an independent source (not shown).

The operation is as follows: Assuming the direction of travel of the selector rod 7 to be upward, the alternating current and direct current windings of the driving magnet A must be so related and distributed as to effect the alternate attraction of armatures 1 and 2 to the poles at the right and left of magnet A. The fluxes set up by the windings of magnet D must be so distributed as to effect the position of armature 15 shown in Fig. 3. The magnet A is then energized from any suitable source. The armatures 1 and 2 will be attracted by the poles of magnet A, first to the poles shown on the right and then to the poles shown on the left. This condition is effected by the alternate differential and cumulative effects of the fluxes set up by the direct current windings and the alternating current windings of the magnet A. The armatures 1 and 2 are each provided with a pivoted member 16. Pivotally mounted on each of the members 16 is a friction clutch 17, the member 16 serving as a link between the armatures 1 and 2 and the friction clutch 17. The friction clutch 17 is provided with an aperture adapted to allow the selector rod 7 to freely move therein. Springs 18 and 19 connect the armature 15 with the freely movable friction clutches 17 as shown. Upon the attraction of the armatures 1 and 2 to the poles at the right of magnet A, the spring 18 having been previously tensioned and the spring 19 put in compression by the actuation of armature 15, there will be a lag in the upward movement of the friction clutches 17. Due to this lag the lower friction clutch 17 frictionally engages the rod 7 and moves it upward while the upper friction clutch 17 assumes a position which permits the rod 7 to freely pass through the aperture therein.

During the next half cycle of the alternating current, the armatures 1 and 2 are attracted to the poles at the left of magnet A and a reversal of conditions is effected. The tension and compression of springs 18 and 19 respectively are not changed, but the upper friction clutch 17 frictionally grips the rod 7 and moves it upward, whereas the lower friction clutch 17 assumes a position which permits the rod 7 to be freely drawn through the aperture therein. From the foregoing description, it is obvious that the friction clutches 17 act alternately, one acting during one-half cycle and the other acting during the second half cycle of the impressed alternating current, to grip the selector rod and move it upwards.

As in the case disclosed in Fig. 1, the selector rod 7 is given two impulses for every cycle of the impressed alternating current, so that a 60-cycle supply would effect a practically uniform movement of the selector rod.

To reverse the direction of travel of the selector rod 7, the polarity of one of the direct current windings of magnet D is reversed, thereby moving the armature 15 upward and interchanging the tension and compression of springs 18 and 19, respectively.

While only one selector rod and the electric motor individual thereto has been shown in the drawings, it is apparent that a plurality of such mechanisms will be employed. With the individual drives it is obvious that if one of the drives fails, this renders inoperative only the selector rod operated thereby.

What is claimed is:

1. A reciprocating motor mechanism comprising a rectilinearly movable rod, and a magneto-electric device individual thereto for frictionally clutching and imparting a continuous motion to said rod.

2. A reciprocating motor mechanism comprising a rod and an electric motor individual thereto for reciprocating said rod said electric motor comprising a plurality of magnetic friction clutches, and magnetic means for actuating said clutches.

3. In a reciprocating motor mechanism, a driven member, a plurality of electro-magnets, and means mounted independently of said driven member whereby said driven member is moved upon the simultaneous actuation of said magnets.

4. A reciprocating motor mechanism comprising a rod, an electric motor individual thereto, and frictional clutch connections between said motor and said rod whereby said rod is adapted to be reciprocated by continuous movement.

5. In a reciprocating motor mechanism, a driving magnet, a driven member, a plurality of clutches associated with said driven member and mounted on said driving magnet, and means for making said clutches alternately effective in moving said driven member upon energization of said driving magnet.

6. In a reciprocating motor mechanism, a driving magnet, a driven member, a plurality of clutches for said driven member, means for moving said driven member in one direction upon the alternate cooperation of said clutches with said driving magnet, and means for interchanging the effects of said clutches whereby said driven member is moved in a reversed direction.

7. In a reciprocating motor mechanism, a driving magnet, and a plurality of clutch magnets, said driving and clutch magnets energized from the same source and having their windings serially connected and so distributed as to effect the alternate cooperation of said clutch magnets with said driving magnet.

8. In a reciprocating motor mechanism, a driven rod, a plurality of magnets, each of said magnets having a winding for alternating current and a winding for direct current, said alternating current windings of said plurality of magnets being serially connected and said direct current windings of said plurality of magnets being serially connected, a source of alternating current, and a source of direct current, said windings so distributed upon said plurality of magnets as to permit the actuation of but two of said magnets simultaneously to move said driven rod.

9. In a stepping mechanism, a driving magnet, a plurality of clutch magnets, means associated with said driving magnet and co-operating with each of said clutch magnets, and means whereby said first mentioned means is rendered inoperative with respect to one of said clutch magnets and operative with respect to another of said clutch magnets during the same interval of time.

10. In a stepping device, a driving magnet having a plurality of oscillating armatures adapted to move in opposite directions, a driven member, and means effective upon the energization of said magnet whereby the movements of said armatures are alternately imparted to said driven member.

11. In a reciprocating motor mechanism, a driven member, a driving magnet having a plurality of armatures, a frictional coupling between each of said armatures and said driven member, an alternating current supply for said driving magnet, and means whereby one of said armatures is effective in moving said driven member during the first half cycle of said current supply and another of said armatures is effective during the second half cycle of said current supply.

12. In a reciprocating motor mechanism, a driving magnet having two magnetic circuits, means for energizing said circuits alternately, a clutch simultaneously operated with the energization of one of said magnetic circuits, a second clutch simultaneously operated with the energization of another of said magnetic circuits, and means effective upon the sequential operation of said clutches whereby said driven member is moved uniformly.

In witness whereof, I hereunto subscribe my name this 24th day of June A. D., 1922.

GEORGE F. ATWOOD.